United States Patent Office 3,567,653
Patented Mar. 2, 1971

3,567,653
COPOLYMER CATALYST SYSTEM AND PRODUCT
Joseph Wagensommer, 57 Barchester Way, Westfield, N.J. 07090; Richard J. Lauria, 16 Ely Place, Edison, N.J. 08817; and John H. Staib, 1224 Radcliff Place, Plainfield, N.J. 07062
No Drawing. Continuation of application Ser. No. 613,727, Feb. 3, 1967, which is a continuation-in-part of application Ser. No. 504,120, Oct. 23, 1965, which in turn is a continuation-in-part of application Ser. No. 464,862, June 17, 1965. This application July 16, 1969, Ser. No. 850,301
Int. Cl. C08f 15/04
U.S. Cl. 252—429
16 Claims

ABSTRACT OF THE DISCLOSURE

A catalyst useful for copolymerizing ethylene and a higher alpha olefin is composed of an alkyl aluminum and the reaction product of, a vanadium compound (such as $VOCl_3$) and an alkyl titanate. Resulting copolymers may have a very high green strength as well as other desirable properties.

CROSS REFERENCES

This application is a continuation of Ser. No. 613,727, filed Feb. 3, 1967, which is a continuation-in-part of Ser. No. 504,120, filed Oct. 23, 1965, which is itself a continuation-in-part of Ser. No. 464,862, filed on June 17, 1965 (all now abandoned). The invention relates to a new catalyst which is useful for the copolymerization of ethylene and higher alpha olefins.

BACKGROUND OF INVENTION

It is well known that ethylene and higher alpha olefins, such as propylene can be copolymerized at low pressures with a catalyst composed of a vanadium compound in conjunction with an alkyl aluminum compound. The copolymer product of this process is a synthetic rubber which can be vulcanized by the use of certain free-radical forming agents such as organic peroxides.

BRIEF SUMMARY

It has now been found that if the polymerization catalyst is modified in accordance with this invention, a copolymer is produced with improved physical and processing properties. Specifically, it has been found that the advantages of this invention are achieved by reacting a selected vanadium compound with a selected titanium compound to get a reaction product which is believed to be a complex, and then adding an aluminum alkyl compound to the resulting reaction product in order to produce a catalyst composition. This catalyst is then used to copolymerize ethylene and a higher alpha olefin.

About 0.05 to 10 moles, preferably 0.15 to 1.5 moles of vanadium compound are reacted per mole of titanium compound; and about 0.05 to 1.0 mole, preferably 0.10 to 0.50 mole of the reaction product is utilized per mole of aluminum alkyl compound.

With the use of the catalyst of this invention, copolymers of controlled molecular weight distribution and monomer distribution can be obtained. Additionally, under selected conditions, copolymers of very high green strength can be produced.

DETAILED DESCRIPTION WITH PREFERRED EMBODIMENTS

The vanadium compound which is used in this invention is a vanadium oxyhalide, a vanadium oxyacetylacetonate or alkyl vanadate. The vanadium oxyhalide has the formula $VOX_3$ wherein X is a halogen having an atomic number equal to or greater than 17, i.e., chlorine, bromine, or iodine. The preferred vanadium oxylhalide is $VOCl_3$.

The vanadium oxyacetylacetonate has the formula $VOA_2$, where A is the acetylacetonate radical or a haloacetylacetonate radical, the halogen being any of chlorine, bromine, iodine, or fluorine. Examples of these compounds include vanadium oxydiacetylacetonate, vanadium oxy bis(dihaloacetylacetonate), and vanadium oxy bis-(tetrahaloacetylacetonate). Preferred of this group is vanadium oxybisacetylacetonate.

The alkyl vanadate has the formula $VO(OR)_3$ wherein R is a $C_1$–$C_{12}$ alkyl group, preferably a $C_2$–$C_6$ alkyl group. Examples of alkyl vanadates are $VO(OCH_3)_3$, $VO(OC_2H_5)_3$, $VO(OC_4H_9)_3$, and $VO(OC_8H_{17})_3$. The preferred alkyl vanadate is $VO(OC_2H_5)_3$. The most preferred vanadium compound is $VOCl_3$ (vanadium oxychloride).

It is to be noted that vanadium tetrahalides such as $VCl_4$, which are frequently used as a catalyst component for the copolymerization of alpha olefins, have no use in this invention.

The titanium compounds of this invention have the general formula $Ti(OR)_4$ where R is a $C_1$–$C_{12}$ alkyl radical. Preferably, R is a $C_2$–$C_6$ alkyl radical. Thus, R may be a methyl, propyl, butyl, pentyl, isopentyl, octyl, or hexyl group. Most preferably, R is a butyl group so that tetrabutyl titanate is the most preferred titanium compound.

The alkyl aluminum compound which is useful in this invention has the formula $R_mAlX_n$ wherein R is a $C_1$–$C_{12}$ monovalent hydrocarbon radical, X is a halogen having an atomic number above 17 (i.e. Cl, Br, or I) or a $C_1$–$C_{12}$ monovalent hydrocarbon radical, m is an integer between 1 and 3 inclusive, and the sum of m plus n is equal to 3.

Specific examples of R and/or X groups include methyl, ethyl, propyl, n-butyl, n-amyl, isoamyl, phenyl, tolyl, and cyclopentyl radicals. Preferred are the $C_1$–$C_5$ alkyl groups such as ethyl and butyl groups. Most preferred is ethyl. The preferred halogen is chlorine.

Examples of suitable alkyl aluminum compounds include triethyl aluminum, tripropyl aluminum, diethyl aluminum chloride, ethyl aluminum dichloride, and aluminum sesquichloride. Most preferred is diethyl aluminum chloride. Mixtures of alkyl aluminum compounds can also be suitably used.

The catalyst of this invention is used to copolymerize ethylene and a $C_3$–$C_{10}$ alpha olefin. The $C_3$–$C_{10}$ alpha olefin may be linear or branched where the branching occurs 3 or more carbon atoms from the double bond, and, while a single olefin is preferable, mixtures of these $C_3-C_{10}$ olefins may be employed. Suitable examples of $C_3-C_{10}$ alpha olefins include: propylene, 1-butene, 1-pentene, 1-hexene, 1-heptene, 1-octene, 1-nonene, 1-decene, 4-methyl - 1 - pentene, 4-methyl-1-hexene, 5-methyl-1-hexene, 4,4-dimethyl - 1 - pentene, 4-methyl-1-heptene, 5-methyl - 1 - heptene, 6-methyl-1-heptene, 4,4-dimethyl - 1 - hexene, 5,6,6-trimethyl - 1 - heptene, 5,5 - dimethyl - 1 - octene, 5-methyl-1-nonene and the like; particularly preferred herein is propylene. The concentration of $C_3-C_{10}$ olefin monomer units in the final copolymer ranges in general from about 10% to about 75% by weight. The copolymers are generally elastomers, although where the ethylene content is relatively high (above about 75%), they have some of the properties of plastics and are often designated as "plastomers".

It is to be understood that the term "copolymer of ethylene and a $C_3-C_{10}$ alpha olefin" is meant to include such copolymers which additionally include a minor amount, i.e., about 0.1–20 wt. percent, preferably 1–5 wt. percent, of a nonconjugated diolefin to add unsaturation to the final product so that it may be conventionally sulfur-cured. Suitable diolefins include 5-methylene-2-norbornene, dicyclopentadiene, 4,7,8,9-tetrahydroindene, 1,5-cyclooctadiene, and 1,4-hexadiene. In this invention 5-methylene-2-norbornene is preferred.

In preparing and using catalysts according to this invention, all steps should be carried out in the absence of oxygen, moisture, carbon dioxide or other harmful impurities. This end is readily accomplished by blanketing all of the raw materials including the catalyst components, monomers, and inert diluents with an inert gas such as dry nitrogen or argon. Preferably, all materials are purified e.g., by drying, distillation, etc., prior to their use.

The conditions at which the polymerization reaction is carried out can vary over a wide range. Generally, temperatures ranging from −40° to 150° C. can be used; however, temperatures ranging from 0° to 60° C. are preferred. Pressures ranging from 0.2 to 1000 p.s.i.g. can be employed in the polymerization reaction; however, pressures in the range of from about 1 atmosphere to 10 atmospheres are more generally used. The reaction times used in the formation of the copolymers depend in general upon the temperatures used. Generally, reaction times ranging from 1 minute to 5 hours can be employed; however, it is more usual to use reaction times ranging from 5 to 60 minutes.

The reaction vessel can be constructed of any material that is inert to the reactants and diluents used, and is capable of withstanding the operating pressures. Reaction vessels made of glass, stainless steel and glass-lined steel are quite satisfactory. Details of the polymerization process have been generally described in the art; see for example copending application No. 334,938.

The copolymers of this invention are rubbery, or at least contain a substantial amount of amorphous material, and may be cured to useful vulcanizates. Where the copolymer has no unsaturation, i.e., does not contain a diolefin monomer, it may be cured with the use of certain free radical generators such as organic peroxides, e.g., dicumyl peroxide, or selected haloaliphatic compounds, e.g., octachlorocyclopentene. Where the copolymer contains unsaturation, conventional sulfur cures are possible. Generally, the copolymers have a molecular weight in the range of 50,000 to 1,000,000 as determined by intrinsic viscosity in decalin solution at 135° C.

Various solvents may be used in the practice of this invention and they include aliphatic, naphthenic, aromatic, and halogenated hydrocarbon solvents, or an excess of the higher alpha olefin such as propylene may be used. Examples of solvents include n-hexane, propane, cyclohexane, toluene, xylenes, tetrachloroethylene, decalin, and chlorobenzenes. Preferably, n-hexane is used.

A variety of oils, carbon blacks, clays and silicas may be used as filler for the rubbers produced by this invention. The carbon blacks which are useful include SAF, SRF, HAF, FEF, and MPC blacks, all of which are commercially available. The amount of carbon black used can be from 0 to 300 parts by weight, but preferably 0 to 200 parts per 100 parts of elastomer is used. From 0 to 250 parts by weight of oil can also be added to obtain the desired balance of physical and processing properties in the final compound.

An unusual feature of this invention is that the copolymer produced with this novel catalyst can be cured to a high tensile strength material when the carbon black filler has a relatively large particle size. Specifically, it has been found that tensile strengths in excess of 900 p.s.i. are obtained when the cured polymer contains 150 to 300 parts by weight of a carbon black having an average particle size in the range of 0.1 to 0.5 micron and 50 to 150 parts by weight of an extender oil.

An additional feature of this invention is that copolymers (including terpolymers) are produced which have unusually high green strengths. The green strength of a polymer is related to its tensile strength before curing. A high green strength insures a minimum of cracking of the polymer when it is pulled from the mill by an extruder. Additionally, a high green strength facilitates the fabrication of articles, such as molded hose, where the uncured elastomer compound is forced onto a mandrel, by eliminating creasing at high stress points. Furthermore, better dimensional control of extruded profiles is provided by minimization of collapse. Thus, copolymers of relatively high green strength, insofar as they do not crack, crease, or collapse, are more easily and economically processed.

Green strength was measured in p.s.i. by the following test. A 4 x 6" single cavity mold was preheated and then lubricated on both mold surfaces. Fifty-five grams of the uncured copolymer containing 200 parts by weight of SRF black and 100 parts by weight of oil was placed in the mold with its grain lengthwise. The mold was placed in a carver press set at 190° F. The platens were then closed and the load increased in three steps up to 24,000 lbs. within 45 seconds. The mold was held under pressure for an additional 75 seconds after which the heat was turned off and water was circulated through the platens until they cooled down to room temperature. The pressure was then released and the compound removed from the mold. The compound pad was then relaxed for about 20 minutes at 25° C., after which the tensile strength was obtained on a Scott Tester at 20 inches/minute.

Green strengths of at least about 250 p.s.i. and higher are desirable and are easily achieved by means of this invention. Preferred are copolymers with a green strength of at least 300 p.s.i.

It has been found that the green strength of the copolymers made with the catalyst of this invention is related to the crystallinity of the polymer which is a function of the weight percent of ethylene in the polymer. Thus, copolymers prepared with the catalyst system of this invention and containing at least about 72 wt. percent of ethylene will have a green strength in the desirable range (i.e., about 250 p.s.i. or higher). Copolymers containing about 73–74 wt. percent of ethylene will have even higher green strengths (in the range of at least about 300). The green strength continues to rise with the proportion of ethylene in the copolymer, although when more than about 80 wt. percent of ethylene is in the copolymer, other processing characteristics are not optimal.

Copolymers produced with conventional catalyst systems do not show this degree of correlation between ethylene content and green strength. Furthermore, commercially available copolymers, even when they contain a high proportion of ethylene, do not have green strengths comparable to the products of this invention.

The invention and its advantages will be better understood by reference to the following examples.

Example 1

A reaction product of VOCl₃ and tetrabutyl titanate was formed specifically as follows: Equal weights of VOCl₃ and Ti(O—Butyl)₄ were dissolved in n-hexane to make a 1.0 g./100 ml. catalyst solution. This formed a homogeneous solution and was accompanied by a significant heat effect apparently due to the formation of a new catalyst complex. This reaction product was added to the reactor with diethyl aluminum chloride and used to polymerize a mixture of ethylene, propylene and 5-methylene-2-norborene in a volume ratio of 1/2.2/.001. In a control experiment the same monomers in the same ratio were polymerized with a mixture of diethyl aluminum chloride and VOCl₃ which was not reacted with a titanium compound. The results are shown in Table I.

TABLE I.—COMPARISON OF CATALYST SYSTEMS

| Run | A | B |
|---|---|---|
| ML–212° F | 33 | 50 |
| Wt. percent C₂= | 59.0 | 60.5 |
| Wt. percent diene (5-methylene-2-norbornene) | 3.4 | 3.3 |
| Catalyst, 0.016 mole | VOCl₃ | 1/1 VOCl₃ Ti(OBu)₄ |
| Cocatalyst, 0.093 mole | Et₂AlCl | Et₂AlCl |
| 60 SRF (20′ at 320° F.) | (1-stearic acid, 5-ZnO, 1-tuads¹, 0.5-captax², 1-sulfur) | |
| Tensile, p.s.i | 2,700 | 2,560 |
| Elongation, percent | 520 | 460 |
| 200% modulus | 850 | 1,050 |
| Shore A hardness | 71 | 71 |
| Scorch³/plasticity⁴ | 10/50 | 9/77 |
| Garvey extrusion: | | |
| Inches/minute | 49 | 33 |
| Rating | 3,443 | 2,343 |
| 200 FEF/100 oil (20′ at 320° F.) | (1-stearic acid, 5-ZnO, 1.5-tuads¹, 0.5-captax², 1.5 sulfur) | |
| Tensile, p.s.i | 750 | 1,260 |
| Elongation, percent | 130 | 210 |
| 100% modulus | 680 | 700 |
| Shore A hardness | 84 | 80 |
| Scorch³/plasticity⁴ | 8/67 | 8/68 |
| Garvey extrusion: | | |
| Inches/minute | 88 | 75 |
| Rating | 4444 | 4444 |

¹ Tetramethylthiuram disulfide.
² Mercaptobenzothiazole.
³ MS–270, minutes to 3 point rise.
⁴ ML–212 (1+8′).

Example 2

Example 1 was repeated with the use of different catalyst compositions of this invention. The results are shown in Table II below:

TABLE II.—COMPARISON OF CATALYST SYSTEMS

| Run | C¹ | D² |
|---|---|---|
| ML–212 | 50 | 60 |
| Wt. percent C₂= | 53.2 | 65.0 |
| Wt. percent diene | 2.9 | 2.9 |
| Catalyst 0.016, 0.018 mole | VOCl₃/ Ti(O—nBu)₄ | VOCl₃/ Ti(O—iPr)₄ |
| Cocatalyst 0.107, 0.085 mole | Et₃Al₂Cl₃ | Et₂AlCl |
| 200 FEF/100 oil (20′ at 320° F.) | (1-stearic acid, 5-ZnO, 1.5-sulfur) | |
| Tensile, p.s.i | 950 | 1,120 |
| Elongation, percent | 190 | 240 |
| 100% modulus | 620 | 600 |
| Shore A hardness | 79 | 78 |
| Scorch/plasticity | 7/84 | 14.5/72 |
| Garvey extrusion: | | |
| Inches/minute | 70.0 | 78.3 |
| Rating | 4444 | 4444 |

¹ Contained 1.5 phr. of tetramethylthiuram disulfide in the curing recipe, 0.5 captax.
² Contained 1.5 phr. of Monex (tetramethylthiuram monosulfide) in the curing recipe, 0.5 Altax (mercaptobenzothiazole sulfide).

Example 3

The following data were obtained to show the differences between terpolymers produced with the catalyst of this invention as compared with a catalyst of the prior art (i.e. VOCl₃ with diethyl aluminum chloride). The differences relate to molecular weight distribution, ethylene distribution, and distribution of the diene in the terpolymer. The terpolymers which are analyzed in the data below are those which were formed in Example 1. Table III represents a control and Table IV relates to the terpolymer of this invention. The molecular weight was determined by the viscosity average method.

TABLE III

[VOCl₃/Et₂AlCl Terpolymer (control)]

| | Mole percent ethylene | Wt. percent diene | M.W. ×10⁻³ |
|---|---|---|---|
| Cumulative percent: | | | |
| 11.2 | 53.8 | 3.04 | 8 |
| 15.3 | 56.7 | 2.64 | 15 |
| 19.4 | | | 26 |
| 22.6 | 61.5 | 3.14 | |
| 26.4 | | | 33 |
| 30.7 | 66.3 | 3.04 | |
| 35.2 | | | 35 |
| 40.2 | 71.3 | 3.41 | |
| 43.1 | | | 49 |
| 46.1 | 72.2 | 3.61 | |
| 49.1 | | | 56 |
| 52.3 | 73.7 | 3.61 | |
| 55.5 | | | 66 |
| 58.5 | 74.2 | 3.84 | 73 |
| 64.9 | | | 79 |
| 68.0 | 73.3 | 3.74 | |
| 71.2 | | | 95 |
| 74.4 | 74.0 | 3.77 | |
| 77.9 | | | 117 |
| 81.1 | 73.7 | 3.86 | |
| 84.0 | | | 127 |
| 86.7 | 75.3 | 4.19 | |
| 88.9 | | | 167 |
| 90.3 | 78.7 | 4.82 | |
| 92.4 | | | 251 |
| 93.9 | 78.8 | 5.28 | |
| 96.4 | 78.6 | 5.13 | 313 |
| 99.5 | 80.0 | 3.88 | 382 |

TABLE IV

[VOCl₃—Ti(O Bu)₄/Et₂AlCl terpolymer]

| | Mole percent ethylene | Wt. percent diene | M.W. ×10⁻³ |
|---|---|---|---|
| Cumulative percent: | | | |
| 8.4 | 65.6 | 3.74 | 8 |
| 13.3 | 68.3 | 3.86 | 28 |
| 17.1 | | | 28 |
| 20.2 | 70.1 | 4.23 | |
| 23.8 | | | 50 |
| 28.5 | 70.0 | 4.16 | |
| 31.1 | 69.4 | 3.97 | |
| 34.0 | | | 97 |
| 37.1 | 69.4 | 3.85 | |
| 40.5 | | | 103 |
| 44.0 | 70.8 | 4.03 | |
| 47.6 | | | 122 |
| 51.1 | 71.0 | 3.85 | |
| 54.7 | | | 160 |
| 58.3 | 72.9 | 3.92 | |
| 61.9 | | | 187 |
| 65.4 | 72.9 | 3.96 | |
| 68.9 | | | 220 |
| 72.2 | 72.7 | 3.98 | |
| 75.4 | | | 255 |
| 78.8 | 73.0 | 3.94 | |
| 82.0 | | | 295 |
| 84.7 | 73.2 | 3.67 | |
| 86.8 | | | 378 |
| 88.4 | 73.8 | 3.64 | |
| 89.8 | | | 485 |
| 91.5 | 72.9 | 3.28 | |
| 93.3 | 73.8 | 3.06 | 710 |
| 94.8 | 73.8 | 2.95 | 810 |
| 97.7 | 74.6 | 2.83 | 825 |
| 98.1 | | | 685 |

Example 4

To show that VCl₄ is not useful in this invention, the following experiment was performed. VCl₄ and

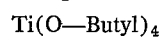

were mixed and a black precipitate formed. The reaction product, in combination with aluminum diethyl chloride, when contacted with the monomers of Example 1, had no catalytic activity and no polymer was formed.

Example 5

To show that copolymers of high green strength can be produced with the catalyst of this invention, the following experiment was performed. A reaction product of VOCl₃ and tetrabutyl titanate was prepared as in Example 1. This reaction product was added to the reactor together with 0.096 mole of aluminum diethyl chloride and used to polymerize a mixture of ethylene, propylene, and 5-methylene-2-norbornene (MNB) in a volume ratio of 1.0/1.0/.001. The results are shown in Table V.

TABLE V

| Run No. | 1 | 2 | 3 |
|---|---|---|---|
| Temperature, °C | 35 | 26.5 | 15 |
| Catalyst conc., lbs./100 lbs. hexane | 0.0065 | 0.006 | 0.007 |
| Ethylene, wt. percent | 74.6 | 75.3 | 72.9 |
| MNB, wt. percent | 2.7 | 2.7 | 2.6 |
| 200 FEF/100 oil: | | | |
| Tensile, p.s.i. | 1,665 | 1,890 | 1,800 |
| Elongation, percent | 180 | 215 | 230 |
| Extrusion rate, inches/minute | 95 | 85 | 75 |
| Mooney scorch at 270° F., $T_3$ | 12.8 | 10.9 | 11.3 |
| Mooney plasticity at 212° F. | 92 | 106 | 106 |
| Green strength, p.s.i. | 320 | 370 | 270 |

Example 6

To show that the green strength of the copolymer is not appreciably affected by the catalyst concentration, or the polymerization temperature, the procedure of Example 5 was repeated except that the ethylene and propylene feed rates were varied as shown. The MNB feed rate was the same as in Example 5.

Table VI shows results achieved with a polymerization temperature of 95° F., and Table VII shows results achieved with a polymerization temperature of 80° F.

TABLE VI.—(95° F.)

| Run. No. | $C_2H_4$ lbs./ 100 lbs. | $C_3H_6$ hexane | Catalyst feed lbs./100 lbs. hexane | Wt. percent $C_2$=in polymer | Green strength, p.s.i. |
|---|---|---|---|---|---|
| 1 | 3.0 | 5.5 | .0055 | 72.0 | 270 |
| 2 | 3.0 | 6.3 | .0055 | 69.7 | 130 |
| 3 | 3.0 | 4.7 | .0055 | 72.3 | 230 |
| 4 | 2.8 | 3.8 | .0065 | 72.7 | 305 |
| 5 | 2.8 | 3.2 | .0065 | 76.2 | 345 |
| 6 | 2.8 | 2.7 | .0065 | 78.0 | 390 |
| 7 | 3.0 | 4.0 | .0085 | 70.5 | 180 |
| 8 | 3.0 | 3.4 | .0085 | 71.6 | 270 |
| 9 | 3.0 | 2.8 | .0085 | 77.0 | 380 |
| 10 | 2.8 | 3.6 | .007 | 74.4 | 300 |

TABLE VII.—(80° F.)

| Run No. | $C_2H_4$ lbs./ 100 lbs. | $C_3H_6$ hexane | Catalyst feed lbs./100 lbs. hexane | Wt. percent $C_2$=in polymer | Green strength, p.s.i. |
|---|---|---|---|---|---|
| 11 | 3.0 | 4.3 | .0055 | 74.5 | 395 |
| 12 | 3.0 | 3.4 | .0055 | 78.0 | 525 |
| 13 | 3.0 | 4.9 | .0055 | 73.6 | 300 |
| 14 | 3.0 | 5.5 | .0065 | 68.0 | 70 |
| 15 | 3.0 | 4.5 | .0065 | 69.9 | 140 |
| 16 | 3.0 | 3.6 | .0065 | 73.8 | 345 |
| 17 | 3.0 | 3.5 | .0085 | 71.2 | 180 |
| 18 | 3.0 | 3.0 | .0085 | 72.5 | 270 |
| 19 | 3.0 | 2.5 | .0085 | 75.8 | 420 |
| 20 | 3.2 | 4.6 | .0060 | 75.3 | 400 |

Example 7

Commercially available elastomeric copolymers produced with conventional catalysts were tested for green strength. As can be seen from the table below, these copolymers did not have high green strengths even when their ethylene content was high.

TABLE VIII

| Polymer | Wt. percent $C_2H_4$ | Green strength, p.s.i. | Wt. percent crystallinity [a] |
|---|---|---|---|
| This invention [b] | 72–78.0 | 250–>500 | 5–15 |
| Royalene 302 [c] | 74.4 | 173 | 1.2 |
| Nordel 1145 [d] | 74.0 | 59 | <1.0 |

[a] As determined from calorimeter heats of fusion.
[b] See Tables VI and VII.
[c] A commercially available terpolymer of ethylene, propylene and about 1 mole percent of a third monomer (believed to be dicyclopentadiene).
[d] A commercially available terpolymer of ethylene, propylene and about 1 mole percent of a third monomer (believed to be 1,4 hexadiene).

This invention has been described in connection with certain specific embodiments thereof; however, it should be understood that these are by way of example rather than by way of limitation, and it is not intended that the invention be restricted thereby.

What is claimed is:

1. A polymerization catalyst component consisting essentially of the reaction product formed by mixing:
   (a) a vanadium compound selected from the group consisting of vanadium oxyhalides wherein the halogen has an atomic number equal to or greater than 17, and $C_1$–$C_{12}$ alkyl vanadates; with
   (b) a titanium compound having the formula Ti(OR)$_4$ wherein R is a $C_1$–$C_{12}$ alkyl radical, the mole ratio of said vanadium compound to said titanium compound being in the range of 0.05 to 10.0 moles of vanadium compound per mole of titanium compound.

2. The catalyst component of claim 1 wherein R in said titanium compound is a $C_2$–$C_6$ alkyl radical.

3. The catalyst component of claim 1 wherein said vanadium compound is a vanadium oxyhalide.

4. The catalyst component of claim 1 wherein said titanium compound is tetrabutyl titanate.

5. The catalyst component of claim 1 wherein said vanadium compound is VOCl$_3$.

6. A process for producing an improved catalyst component which comprises:
   (a) reacting a vanadium compound selected from the group consisting of vanadium oxyhalides wherein the halogen has an atomic number equal to or greater than 17 and $C_1$–$C_{12}$ alkyl vanadates; with
   (b) a titanium compound having the formula Ti(OR)$_4$ wherein R is a $C_1$–$C_{12}$ alkyl radical, the mole ratio of said vanadium compound to said titanium compound being in the range of 0.05 to 10 moles of vanadium compound per mole of titanium compound.

7. The process of claim 6 wherein said vanadium compound is VOCl$_3$.

8. The process of claim 6 wherein said titanium compound is tetrabutyl titanate.

9. A catalyst composition consisting essentially of 1 mole of an aluminum alkyl compound of the formula R$_m$AlX$_n$ wherein R is a $C_1$–$C_{12}$ monovalent hydrocarbon radicals and halogens having an atomic number equal to or greater than 17, $m$ equals 1–3 and the sum of $m$ and $n$ is equal to three; in combination with 0.1 to 0.5 mole of the catalyst component of claim 1.

10. The composition of claim 9 wherein X in the aluminum alkyl compound is chlorine.

11. The composition of claim 9 wherein said titanium compound is tetrabutyl titanate.

12. The composition of claim 9 wherein said vanadium compound is VOCl$_3$.

13. The composition of claim 9 wherein said aluminum alkyl compound is diethyl aluminum chloride.

14. The catalyst component of claim 1 wherein said vanadium compound is VOCl$_3$ and said titanium compound is tetrabutyl titanate.

15. The process of claim 6 wherein said vanadium compound is VOCl$_3$ and said titanium compound is tetrabutyl titanate.

16. The catalyst composition of claim 9 wherein said aluminum alkyl compound is diethyl aluminum chloride and said catalyst component consists essentially of VOCl$_3$ and tetrabutyl titanate.

References Cited

UNITED STATES PATENTS

| 2,936,302 | 5/1960 | Jones et al. | 252—431X |
| 3,173,901 | 3/1965 | Newberg et al. | 252—429(C)X |
| 3,228,921 | 1/1966 | Gumboldt et al. | 260—88.2 |

PATRICK P. GARVIN, Primary Examiner

U.S. Cl. X.R.

252—431; 260—88.2

PO-1050
(5/69)

UNITED STATES PATENT OFFICE
CERTIFICATE OF CORRECTION

Patent No. 3,567,653      Dated March 2, 1971

Inventor(s) Joseph Wagensohmer, Richard J. Lauria, John H. St

It is certified that error appears in the above-identified patent and that said Letters Patent are hereby corrected as shown below:

Insert following inventors' names:

--ASSIGNED TO ESSO RESEARCH AND ENGINEERING COMPAN'

Signed and sealed this 31st day of August 1971.

(SEAL)
Attest:

EDWARD M. FLETCHER, JR.            WILLIAM E. SCHUYLER, JR.
Attesting Officer                  Commissioner of Patents